United States Patent [19]
Nishino et al.

[11] Patent Number: 5,791,369
[45] Date of Patent: *Aug. 11, 1998

[54] PRESSURE TYPE FLOW RATE CONTROL APPARATUS

[75] Inventors: Koji Nishino; Nobukazu Ikeda; Akihiro Morimoto; Yukio Minami; Koji Kawada; Ryosuke Dohi; Hiroyuki Fukuda, all of Osaka, Japan

[73] Assignee: Fujikin Incorporated, Osaka, Japan

[*] Notice: The term of this patent shall not extend beyond the expiration date of Pat. No. 5,669,408.

[21] Appl. No.: 812,330

[22] Filed: Mar. 5, 1997

Related U.S. Application Data

[62] Division of Ser. No. 661,181, Jun. 10, 1996.

[30] Foreign Application Priority Data

Jun. 12, 1995 [JP] Japan .................... 7-144722

[51] Int. Cl.$^6$ .................................................... E03B 11/00
[52] U.S. Cl. .................. 137/269; 137/487.5; 137/613; 137/468
[58] Field of Search .................... 137/487.5, 486, 137/613, 884, 468, 269

[56] References Cited

U.S. PATENT DOCUMENTS

| | | | |
|---|---|---|---|
| 4,431,020 | 2/1984 | Kowalski | 137/110 |
| 4,463,969 | 8/1984 | Harrison | 137/613 |
| 4,508,127 | 4/1985 | Thurston | 137/8 |
| 4,573,491 | 3/1986 | Arens et al. | 137/218 |
| 4,836,233 | 6/1989 | Milgate, III | 137/14 |
| 4,895,500 | 1/1990 | Hok et al. | 417/566 |
| 5,146,941 | 9/1992 | Stadler | 137/8 |
| 5,148,829 | 9/1992 | Deville | 137/486 |
| 5,190,068 | 3/1993 | Philbin | 137/8 |
| 5,460,196 | 10/1995 | Yonnet | 137/487.5 |

*Primary Examiner*—Denise L. Ferensic
*Assistant Examiner*—Ramyar Farid
*Attorney, Agent, or Firm*—Griffin, Butler, Whisenhunt & Szipl

[57] ABSTRACT

A pressure type flow rate control apparatus (1) for controlling flow rate of a fluid maintains an upstream side pressure P1 of an orifice at more than about twice a downstream side pressure P2. In addition to an orifice-forming member (5) the apparatus includes a control valve (2) provided at the upstream side of the orifice, a pressure detector (3) provided between the control valve and the orifice, and an operation control device (6) for calculating a flow rate Qc from the detected pressure P1 of the pressure detector as Qc=KP1 (K being a constant) and issuing a difference as a control signal Qy between a flow rate command signal Qs and the calculated flow rate Qc to a drive unit of the control valve. The orifice upstream side pressure P1 is adjusted by opening and closing the control valve, thereby controlling the orifice downstream side flow rate.

6 Claims, 9 Drawing Sheets

PRESSURE TYPE FLOW RATE CONTROL APPARATUS

This is a divisional application of Ser. No. 08/661,181, filed Jun. 10, 1996.

BACKGROUND OF THE INVENTION

The present invention relates to an improved control apparatus for gas or the like of a type mainly used in semiconductor manufacturing plants and chemical manufacturing plants.

1. Prior Art

Gas flow rate control apparatus, so-called mass flow controllers, have been widely employed in semiconductor manufacturing plants.

Such prior-art mass flow controllers, however, have various problems; for example: (1) response speeds have been relatively slow in cases of thermal-type flow rate sensors, (2) control precision in low flow rate regions have been poor and precision has varied among products, (3) operating troubles have occurred frequently and stability has been insufficient, and (4) product prices have been high, replacement parts have been expensive, and hence operating costs have been high.

To avoid such problems of mass flow controllers, differential pressure type flow rate control apparatus, such as the structure shown in FIG. 12, are widely used.

That is, such a differential pressure type flow rate control apparatus determines a differential pressure $\Delta P$ between fluid at upstream and downstream sides of an orifice 30 from detected values of pressure detectors 31, 32, calculates in its CPU a detected flow rate as $Qc = K\sqrt{\Delta P}$ and a flow rate difference $(Qy = Qc - Qs)$ between the detected flow rate Qc and a set flow rate Qs, issues the flow rate difference Qy to a flow rate control valve 33 as a control signal, and controls opening and closing of the flow rate control valve 33 for bringing the flow rate difference Qy to zero.

This differential pressure type flow rate control apparatus has its own problems; that is: (1) since a range of the detected flow rate Qc is raised to a power of ½ of a range of the pressure detectors 31, 32, the detection precision of the detected flow rate Qc drops; (2) to raise the measuring precision of flow rate, it is necessary to form a laminar flow of fluid by installing relatively long straight ducts at the upstream and downstream sides of the orifice, which consequently increases the size of the apparatus; and (3) two pressure detectors are needed, so that it is hard to lower manufacturing costs.

2. Problems that the Invention Solves

It is hence a direct object of the invention to provide a pressure type flow rate control apparatus which avoids the problems in mass flow controllers and differential pressure type flow rate control apparatus such as: (1) generally low detecting precision and (2) difficulty in reducing the size of apparatus or lowering the manufacturing cost of the apparatus. Hence it is an object of this invention to provide a pressure type flow rate control apparatus capable of controlling flow rate to a high precision, but yet being relatively small in size and relatively low in manufacturing cost. Similarly, it is an object of this invention to provide such a pressure type flow rate control apparatus which operates by calculating a detected flow rate in a form normally proportional to a detected pressure value on a basis of a detected pressure of a single pressure detector.

SUMMARY

According to the invention, as described herein, by holding pressure P1 upstream of an orifice to be more than about twice the pressure P2 downstream of the orifice a linear functional relationship is established between the pressure P1 and a flow rate downstream the orifice so that by adjusting the upstream pressure P1 on the basis of this relationship, the downstream side flow rate Qc is automatically controlled at a set value.

As a result, as compared with a conventional mass flow controller, a measuring precision in the low flow rate region is heightened, and troubles are reduced, and moreover, manufacturing costs are notably lowered although excellent results are obtained.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 1:
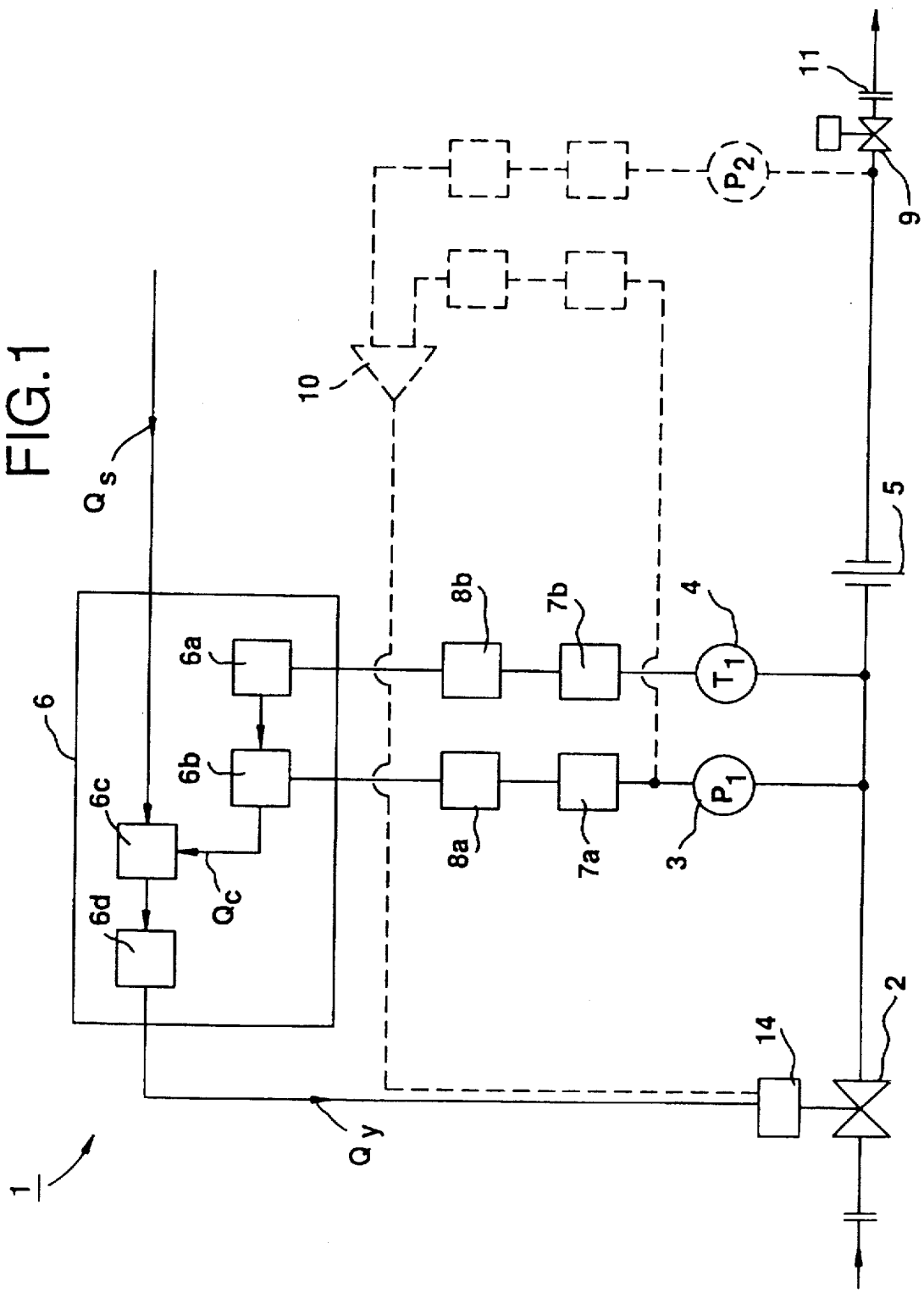
FIG. 1 is a block diagram showing a structure of a pressure type flow rate control apparatus of this invention.

By way of background, a known feature of gas flowing through a nozzle is that: when a pressure ratio P2/P1 of gas upstream under downstream of a nozzle becomes lower than a critical pressure ratio of gas (about 0.5 in the case of air or nitrogen), a flow velocity of the gas passing through the nozzle reaches sound velocity, and pressure fluctuations at the downstream side of the nozzle are not propagated to the upstream side, so that a stable mass flow rate corresponding to the state of the upstream side the nozzle is obtained.

In the case of a nozzle, owing to the viscosity of the gas, a product of a nozzle sectional area and the sound velocity does not directly express actual flow rate of the gas, and to calculate the flow rate of the gas, as a matter of course, an effluence coefficient determined by a form (or shape) of the nozzle must be obtained.

Accordingly, in arriving at the present invention, repeated tests to obtain effluence coefficients for various forms of nozzles and fluids (gases) were carried out. It was noted in the process of these repeated tests that the downstream side pressure fluctuations were not propagated to the upstream side when the pressure ratio P2/P1 of gas was below the critical pressure ratio of the gas. The relationship between the orifice form (or shape) and gas flow rate and the relationship between the gas pressure P1 of upstream side and gas flow rate with a small orifice instead of a nozzle was further measured and tested. As a result, it was discovered that the gas flow rate passing through a plate-shaped small orifice changes in normal, or direct, proportion to the gas pressure P1 of the upstream side, regardless of the type of gas when the diameter of the small orifice is constant so long as the pressure ratio P2/P1 of gas is below the critical pressure of the gas.

That is, the detected gas flow rate Qc passing through the small orifice is normally proportional to the pressure P1 on the upstream side of the orifice and hence by automatically controlling the upstream side pressure P1, it is possible to realize feedback control of the flow rate passing through the orifice.

Moreover, since the gas flow rate passing through the orifice is not affected by the gas flow velocity distribution at the upstream side of the orifice or pressure fluctuations at the downstream side the orifice, a straight duct is not needed at the upstream side, and the size of the apparatus can be reduced substantially and only one pressure detector is needed, so that manufacturing costs of the flow rate control apparatus can be lowered.

Furthermore, because a linear function is established between the flow rate and the pressure, the range of the pressure detection apparatus and that of flow rate becomes identical. Therefore, as compared with conventional differential pressure type flow rate control apparatus, a higher flow-rate-detection precision is achieved.

Hitherto, in manufacturing a flow rate control valve of a disk touch type, it has been the empirical practice to calculate gas flow rate Qc passing through the valve by the formula Qc=KSP1 (where S is a minimum flow passage area, P1 is a primary side pressure, and K is a constant) in the case of the pressure ratio P2/P1 of gas below the critical pressure ratio.

However, the actual gas flow rate Q in this flow rate control valve is about ±20% of the flow rate calculated in the formula of Qc=KSP1, and it is difficult to apply the relation of Qc=KSP1 to precise measurement of gas flow rate.

The invention has been created on a basis of the above findings by the inventors, and relates to a pressure type flow rate control apparatus for controlling flow rate of a fluid by maintaining the pressure P1 upstream of an orifice at more than about twice a downstream-side pressure P2, comprising an orifice 5, a control valve 2 provided at an upstream side of the orifice 5, a pressure detector 3 provided between the control valve 2 and the orifice 5, and a calculation control device 6 for calculating a flow rate Qc based on the detected pressure P1 of the pressure detector 3 using the formula Qc=KP1 (K being a constant), and feeding a difference between a flow rate command signal Qs and the calculated flow rate signal Qc to a drive unit 14 of the control valve 2 as a control signal Qy, wherein the pressure P1 upstream the orifice is adjusted by opening and closing of the control valve, thereby controlling the flow rate downstream the orifice.

Operation of the Invention

The fluid pressure P1 at the upstream side of the orifice 5 is detected by the pressure detector 3, and is fed to the calculation control device 6.

In the calculation control device, the flow rate Qc is calculated using the formula of Qc=KP1, and the flow rate command values Qs and Qc are compared and a control signal Qy corresponding to the difference between Qc−Qs is fed into the drive unit 14 of the control valve 2.

That is, the control valve 2 is opened or closed by the control signal Qy for bringing the difference Qc−Qs to zero so that the flow rate Qc downstream the orifice is always held at the set flow rate (flow rate command value) Qs.

Embodiments

Referring now to the drawings, an embodiment of the invention is described below. FIG. 1 is a block diagram of a flow rate control apparatus of the invention, in which this flow rate control apparatus is comprised of a control valve 2, a pressure detector 3, a temperature detector 4, an orifice 5, a calculation control device 6, amplifiers 7a, 7b, A/D converters 8a, 8b, an orifice corresponding valve 9, a gas take-out joint 11 and other elements.

The control valve 2 is a metal diaphragm valve of a so-called direct touch type described below, and its drive unit includes a piezoelectric-element drive device type. Other possible examples of the drive unit of the control valve 2 may include, among others, magnetic-distortion-element type drive devices, solenoid type drive devices, motor type drive devices, air pressure type drive devices and thermal-expansion type drive devices.

The pressure detector 3 is a semiconductor distortion type pressure sensor, but the pressure detector 3 may also be a metal-foil-distortion type pressure sensor, electrostatic-capacity type pressure sensor, magnetic-resistance type pressure sensor, and other types of pressure sensors.

A resistance bulb-type temperature sensor and other types of temperature sensors may also be used as the temperature detector 4, instead of a thermocouple type temperature sensor.

The orifice 5 is produced by cutting a hole with a spark cutter in a thin metal plate gasket, but an orifice which is formed in a metal membrane with an extremely thin pipe or etching may also be used.

A calculation control circuit 6 is formed of a so-called control circuit board and comprises a temperature correction circuit 6a, a flow rate calculation circuit 6b, a comparator 6c, an amplifier 6d and other elements.

Referring to FIG. 1, the gas pressure P1 at the outlet side of the control valve 2, that is at the upstream side of the orifice 5, is detected by the pressure detector 3, and a corresponding signal, digitized through the amplifier 7a and A/D converter 8a, is fed into the flow rate calculation circuit 6b.

Similarly, the gas temperature T1 upstream the orifice is detected by the temperature detector 4, and a signal digitized through the amplifier 7b and A/D converter 8b is fed into the temperature correction circuit 6a.

In the calculation control circuit 6, a flow rate Q'=KP1 is calculated using the pressure signal P1, and the flow rate Q' is subject to temperature correction by using the correction signal from the temperature correction circuit 6a, and a calculated flow rate signal Qc is fed into the comparator 6c.

On the other hand, a flow rate command signal Qs is fed into the comparator 6c where it is compared with the calculated flow rate signal Qc, and the difference signal Qy=Qc−Qs is output to the drive unit 14 of the control valve 2 as a control signal.

That is, when the calculated flow rate signal Qc is greater than the flow rate command signal Qs, the valve drive unit 14 is operated in a direction of closing the valve 2, and when the Qc is smaller than the Qs, it is operated in a direction of opening the control valve 2, thereby automatically controlling the opening degree of the control valve 2 to achieve Qc=Qs.

As a matter of course, in the invention, it is required that, between the gas pressure P1, upstream of the orifice, and the gas pressure P2, downstream of the orifice, a ratio of P2/P1 must be smaller than about 0.5; that is, the upstream gas pressure P1 must be more than about twice as large as the downstream pressure P2. This should always be established.

Accordingly, as indicated by dashed lines in FIG. 1, the upstream-side gas pressure P1 and downstream-side pressure P2 are fed into an inverting amplifier 10, and when the magnitudes of the pressures P1 and P2 are inverted (that is, in a counter flow state), or when a state of P2/P1>0.5 occurs (that is, the flow rate control of high precision is disabled although a counter flow is not caused), the control valve may be closed automatically.

Figure 2:
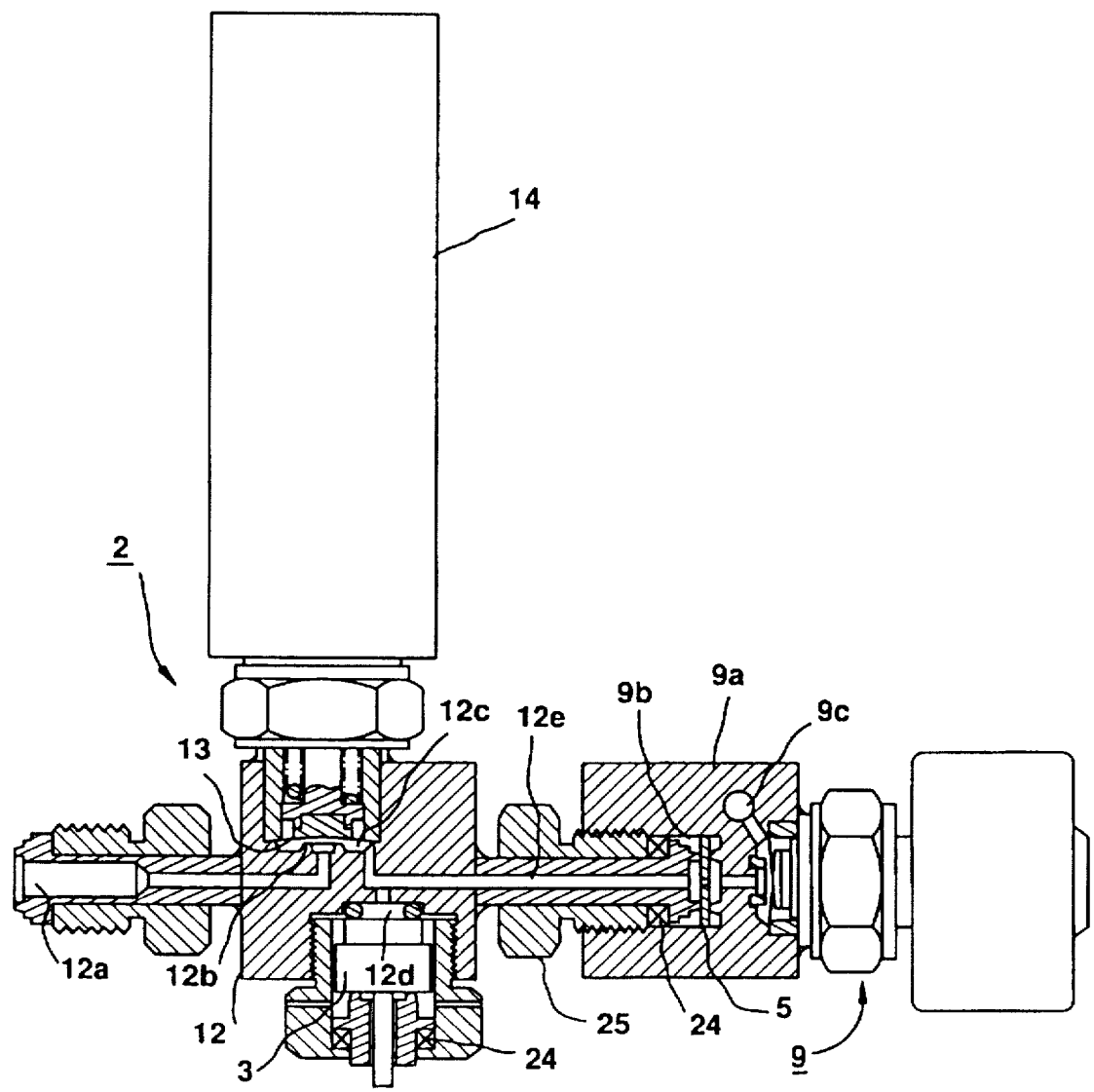
FIG. 2 is a vertical, partially sectional, view of a pressure type flow rate control apparatus of this invention.
Figure 3:
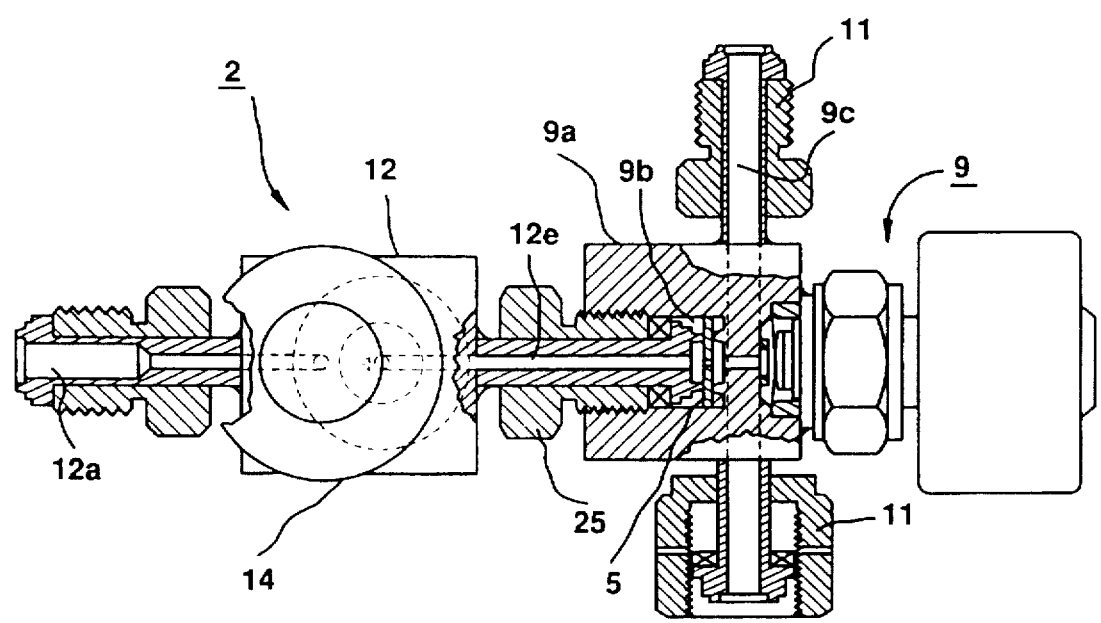
FIG. 3 is a lateral, partially sectional, view of the pressure type flow rate control apparatus of FIG. 2.
Figure 4:
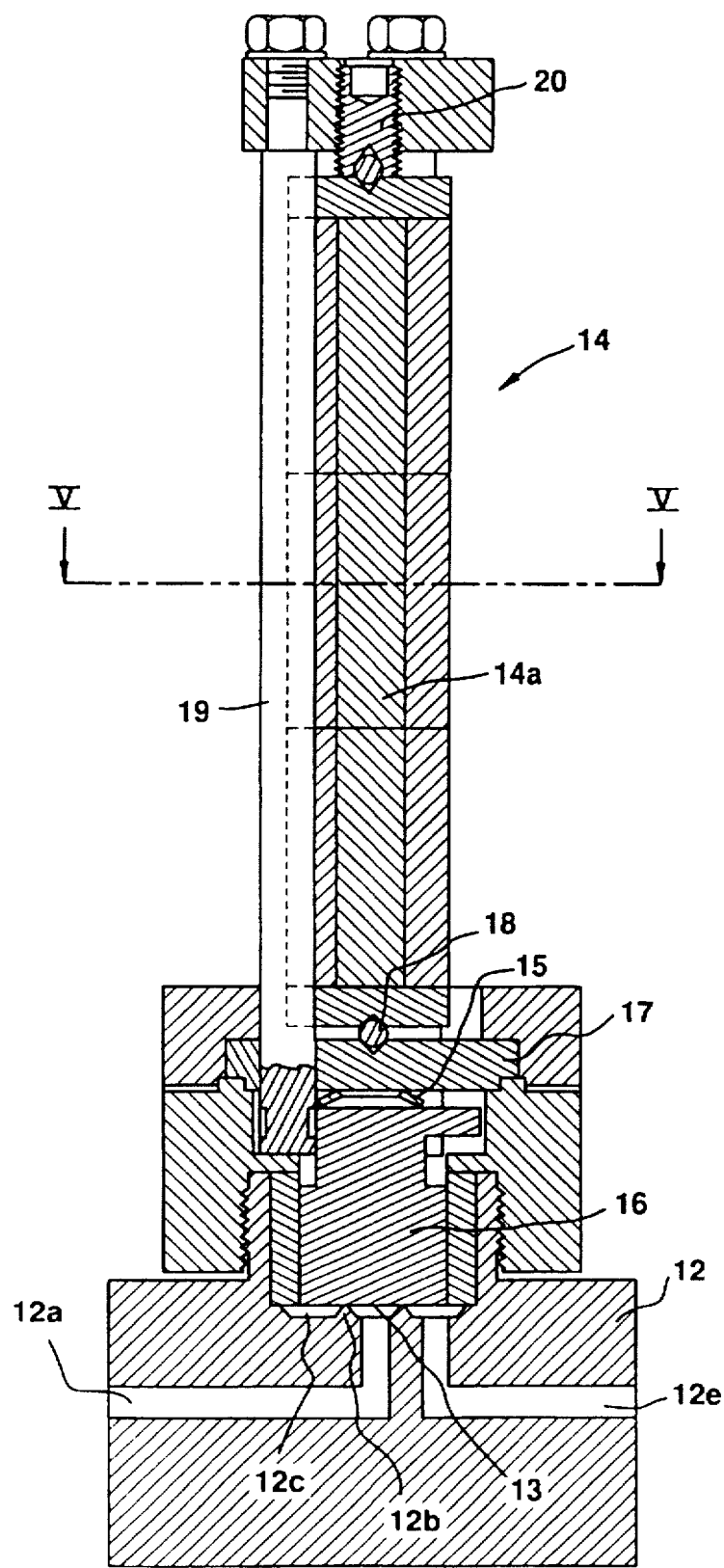
FIG. 4 is a vertical sectional view of a control valve having a piezoelectric element type drive unit for use in a device of this invention.
Figure 5:
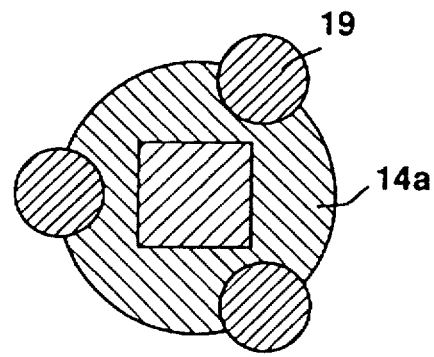
FIG. 5 is a sectional view taken on line V—V in FIG. 4.

FIGS. 2 and 3 are respectively a vertical sectional view and a lateral sectional view showing an example of a portion of an apparatus of the invention, excluding the calculation control device 6, and FIGS. 4 and 5 are respectively a vertical sectional view and a perspective sectional view on line V—V of an apparatus comprising a piezoelectric-element-type drive unit. In FIGS. 2 to 4, reference numeral 2 identifies the control valve, 3 identifies the pressure detector, 5 identifies the orifice, 9 identifies the orifice corresponding valve, 11 identifies the gas take-out joint, 12 identifies a valve main body, 13 identifies a diaphragm, and 14 identifies a drive unit.

The control valve 2 is comprised of the valve main body 12 made of stainless steel for defining a fluid inlet 12a, a valve seat 12b, a valve chamber 12c, a pressure detector mounting hole 12d, and a fluid outlet 12e, and other elements including the diaphragm 13 made of stainless steel, nickel, or cobalt alloy, and the piezoelectric element type drive unit 14 for pressing the diaphragm 13 downward.

In the apparatus in FIG. 4, the diaphragm 13 is always pressed downward by elasticity of a belleville spring 15, thereby shutting against the valve seat 12.

Furthermore, a diaphragm holder 16 is pulled upwardly by a piezoelectric element support member 19 by applying an input to a piezoelectric element 14a, when it is extended. As a result, the diaphragm 13 elastically returns upwardly departing from the valve seat 2b, so that the vale is opened.

In this embodiment, as shown in FIG. 4, the piezoelectric element drive unit 14 comprises a combination of three, series connected, piezo element units 14a having a displacement of 16 μm, 5 mm×5 mm×18 mm and in FIGS. 4 and 5, reference numeral 16 identifies the diaphragm holder, 17 identifies a base body, 18 identifies a ball, 19 identifies a piezoelectric element support member (super-Invar material), and 20 identifies a stroke adjusting screw.

The piezoelectric element support member 19 is made of Super-Invar material whose thermal expansion rate is nearly equal to a rate of thermal expansion of the piezoelectric elements (piezo elements).

Figure 6:
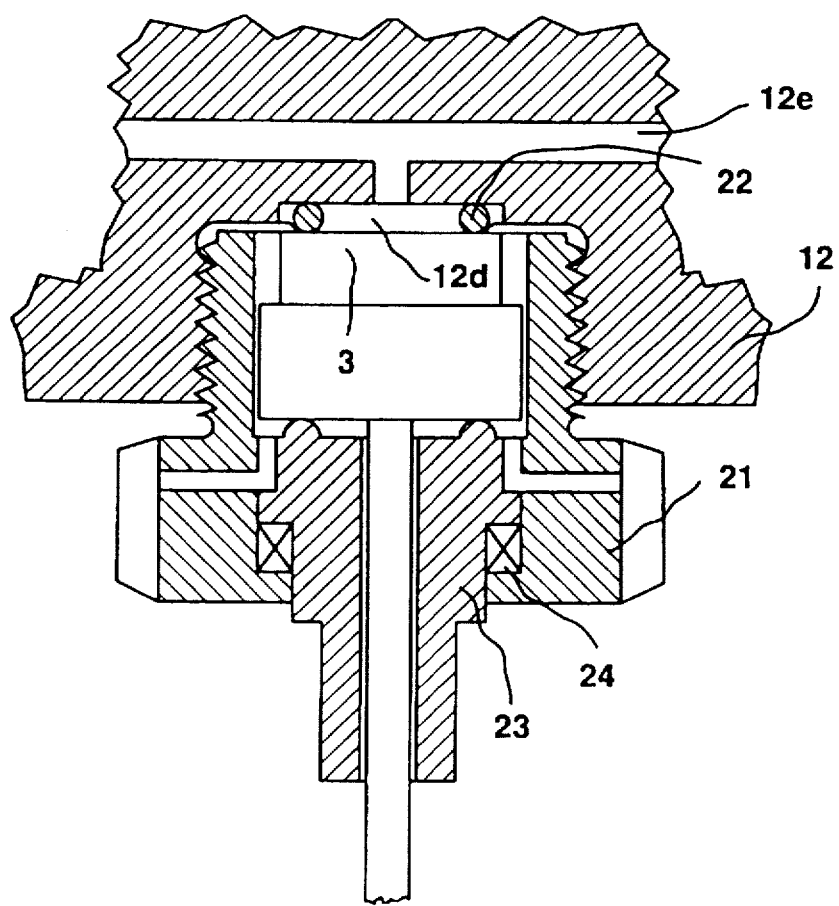
FIG. 6 is a segmented, vertical, sectional view showing a mounting part of a pressure detector of a pressure type flow rate control apparatus of this invention.

FIG. 6 shows in detail a part where the pressure detector 3 is mounted, and in this embodiment, the pressure detector 3, made of semiconductor strain gauges, is held air-tightly against a metal O-ring 22 in the mounting hole 12d, provided at a lower face of the valve main body 12, by set nuts 21.

In FIG. 6, reference numeral 23 identifies a sleeve, and 24 identifies a bearing, and instead of the metal O-ring 22, a metal C-ring or metal gasket may also be used.

Figure 7:
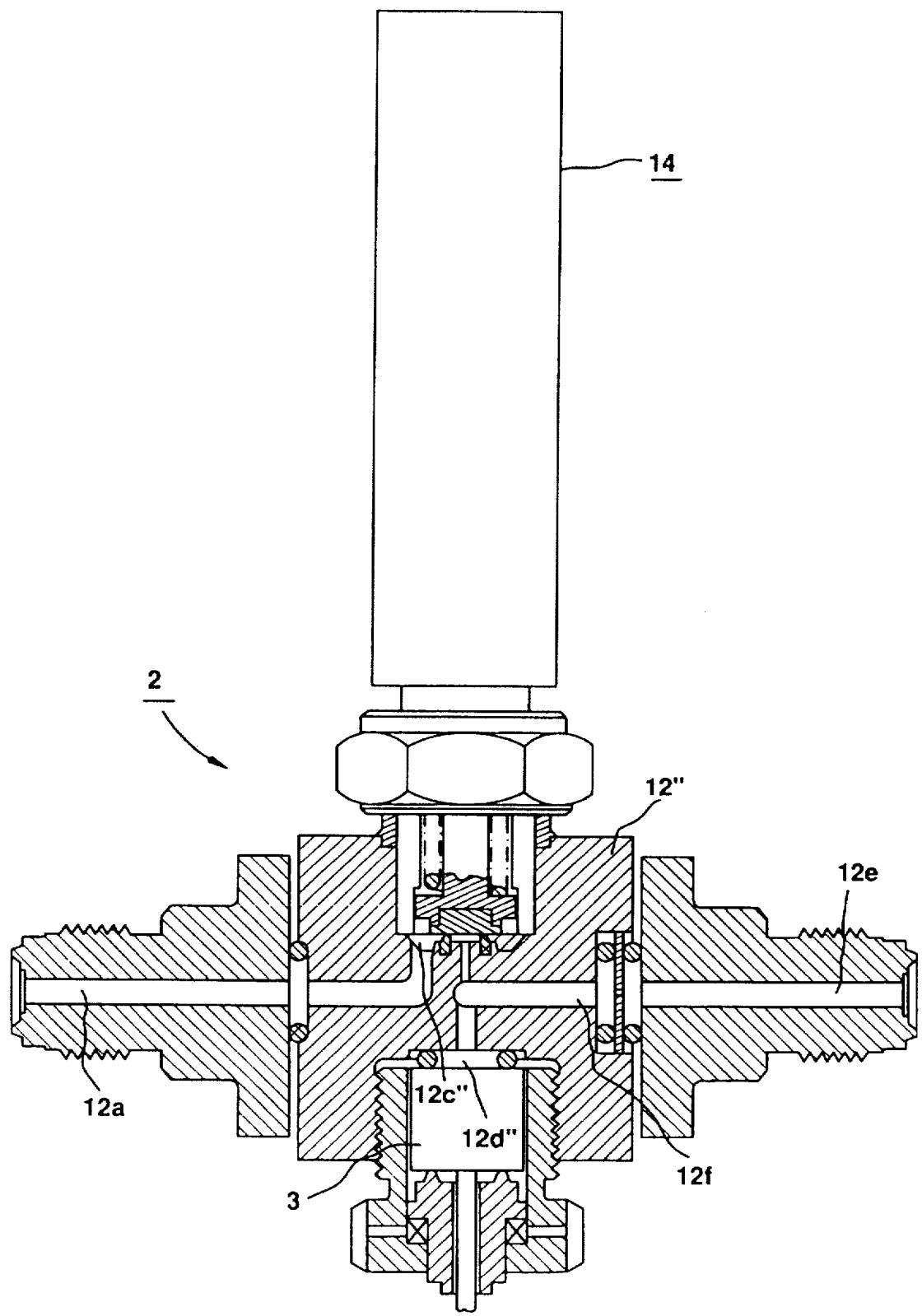
FIG. 7 is a vertical, partially-sectional, view showing another embodiment of the pressure type flow rate control apparatus of this invention.

Furthermore, in the depicted embodiment, the pressure detector mounting hole 12d is formed in the bottom, slightly downstream the valve chamber 12c, of the valve main body 12, but, as shown in FIG. 7, a mounting hole 12d" may be provided opposite a valve chamber 12c" at a lower face of a valve main body 12".

The orifice 5 is provided at the downstream side of the pressure detector 3 as shown in FIG. 2, and in this embodiment it is positioned in a fluid inlet 9b of a valve main body 9a of the valve 9, a metal diaphragm type valve, corresponding to the orifice, with the valve main body 9a being fixed to a bearing 24 by tightening a set screw 25. In FIGS. 2 and 3, reference number 9c identifies a fluid outlet of the orifice-corresponding valve 9.

Figure 8:
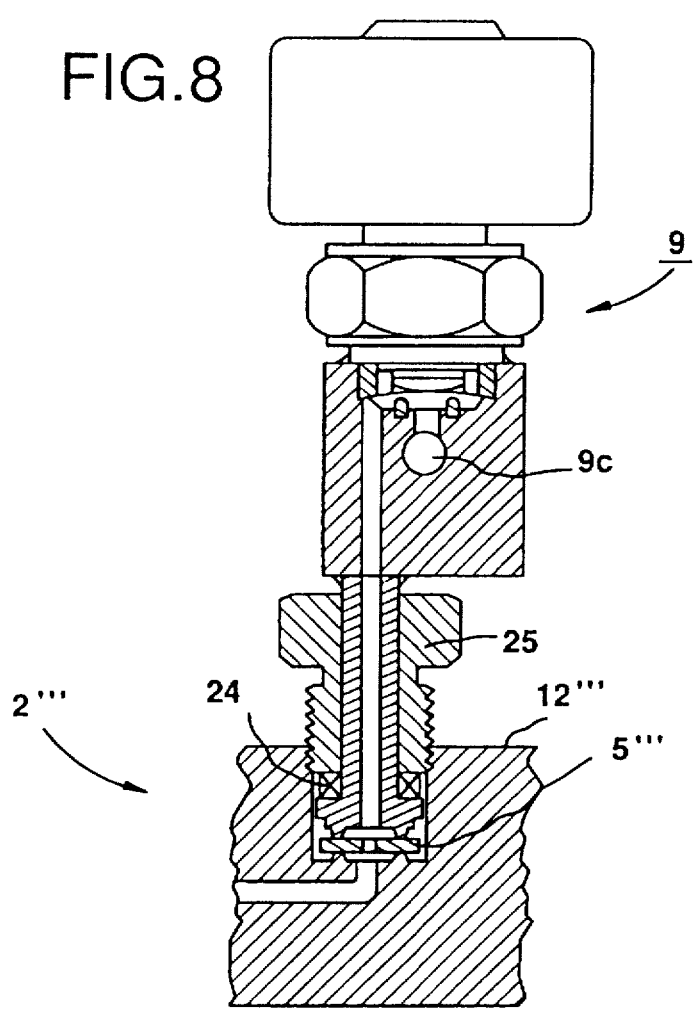
FIG. 8 is a segmented, vertical, partially-sectional view showing another embodiment for providing an orifice in a valve main body of a control valve of this invention.

FIG. 8 shows an example of mounting an orifice 5''' at a valve main body 12''' side of a control valve 2''', with the structure itself for mounting being similar to that of FIG. 2 in which the orifice is provided at the valve main body 9a side of the orifice-corresponding valve 9.

Figure 9:
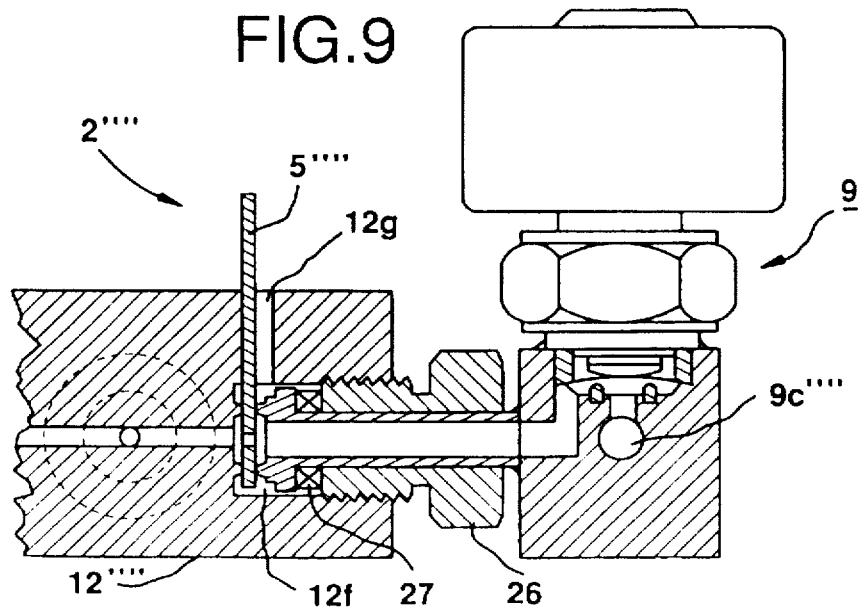
FIG. 9 is a segmented, vertical sectional view showing a further different embodiment for providing an orifice in a valve main body of a control valve of this invention.

FIG. 9 shows a different example for positioning an orifice forming member 5'''', with the orifice forming member 5'''' itself being exchangeable.

That is, a ring-shaped contact surface is formed in an orifice mounting hole 12f of a valve main body 12'''', and an orifice insertion hole 12g is formed in a direction perpendicular to a fluid passage, and the plate-shaped orifice forming member 5''' is inserted into the mounting hole 12f from above through the insertion hole 12g, and by tightening a tightening holding element 26, the orifice forming member 5'''' is fixed via a bearing 27.

When replacing the orifice forming member 5'''' depending on a flow rate range, the holding element 26 is loosened, the orifice forming member 5'''' is exchanged, and the holding element 26 is again tightened.

In the invention, the valve main body 12'''' of a control valve 2'''' is formed in the shape of a block and the orifice mounting hole 12f and a pressure detector mounting hole 12d''''' are formed integrally therein, and hence a volume of a fluid passage space inside the flow rate control apparatus is very small, and gas purging performance is enhanced.

Figure 10:
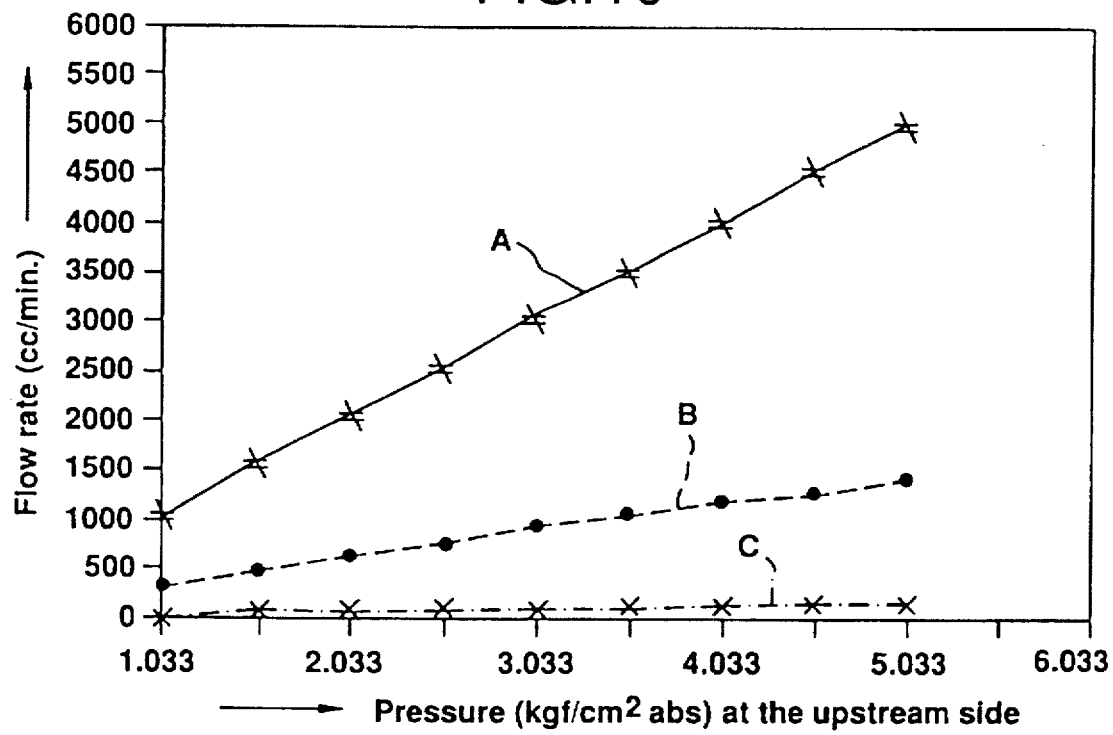
FIG. 10 is a diagram showing flow rate control characteristics of a pressure type flow rate control apparatus of this invention, with a downstream pressure of the orifice at a vacuum.
Figure 11:
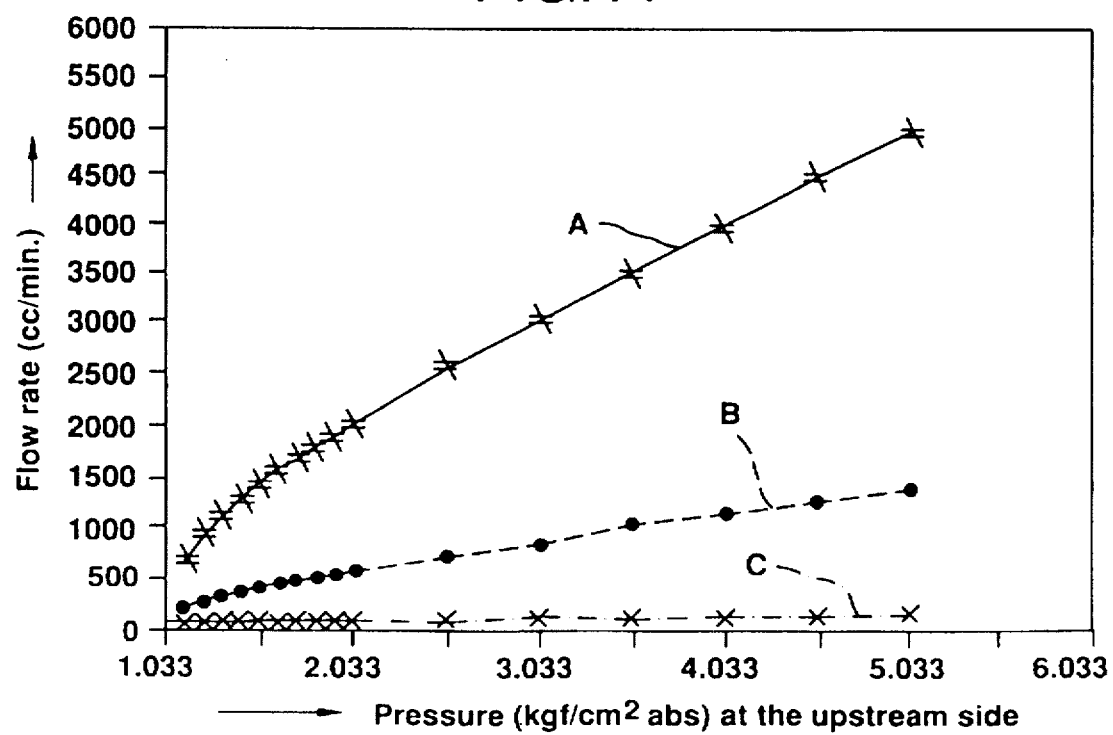
FIG. 11 is a diagram showing flow rate control characteristics of a pressure type flow rate control apparatus of this invention when the pressure downstream of the orifice is at atmospheric pressure; and, FIG. 12 is a block diagram of a convention differential pressure type flow rate control apparatus.
Figure 12:
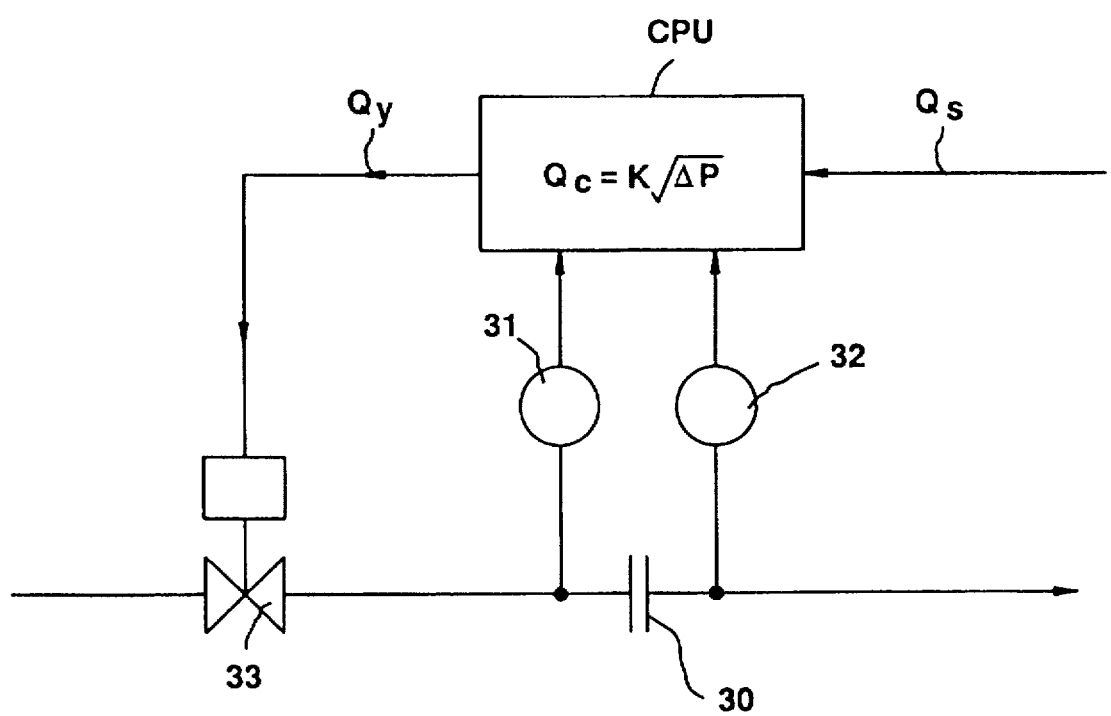

FIGS. 10 and 11 show flow rate control characteristics when gas of a pressure type flow rate control apparatus of the invention is nitrogen, and more specifically the downstream side of the orifice 5 has a vacuum thereat of about 10 Torr (in FIG. 10), and the downstream side is at atmospheric pressure (in FIG. 11).

It is clear from FIGS. 10 and 11 that in a range where the upstream side pressure P1 is more than about twice the downstream side pressure P2, the flow rate Qc and P1 are kept in linear relation. In FIGS. 10 and 11, curves A, B, C refer to orifice inside diameters of 0.37 mm, 0.20 mm and 0.07 mm, respectively.

Table 1 compares a precision and other properties between a pressure type flow rate control apparatus of the invention with that of a conventional differential pressure type flow rate control apparatus, assuming that the measuring ranges and precision of the pressure detectors used are identical.

TABLE 1

|  | Differential pressure type flow rate control apparatus | The invention |
|---|---|---|
| Measuring range of pressure detector | 1:50 | 1:50 |
| Precision of pressure detector | ±0.25% | ±0.25% |
| Calculated flow rate range | 1:7 | 1:50 |
| Flow rate measuring precision | ±0.9% | ±0.25% |
| Measuring range at maximum graduation of 100 cc/min | 14–100 | 2–100 |
| Size (supposing differential flow meter to be 1) | 1 | 0.5 |

As is clear from this table, the invention is, as compared with the differential pressure type flow rate control apparatus, excellent in measuring precision of flow rate and measuring range, and is physically smaller in size.

Table 2 compares characteristics between a conventional standard mass flow controller and the invention. As is clear from this table, too, the invention is clearly superior to the mass flow controller in measuring precision in low flow rate ranges and in manufacturing costs.

TABLE 2

|  |  | Mass flow controller | The invention |
|---|---|---|---|
| Precision | Error | ±1% | ±0.25% |
|  | Error at flow rate of 2% of maximum flow rate | ±50% | ±12.5% |
| Trouble | Initial failure | Present (Yes) | None |
|  | Clogging of valve | Present (Yes) | Possible |
| Cost | Manufacturing cost | 1 | 0.75 of mass flow controller |
|  | Running cost | High | None |

In the invention, as compared with conventional differential pressure type flow rate control apparatus, a higher flow rate detecting precision is achieved, and apparatus size is reduced; hence manufacturing costs are lowered.

Furthermore, in the invention, by controlling the pressure P1 at the orifice upstream side, the orifice downstream side flow rate is obtained in a linear-function form as a function of the pressure P1, and hence feedback control of flow rate is easy, stability of the control apparatus is enhanced, and manufacturing costs are lowered.

The invention thus brings about excellent practical effects.

The invention claimed is:

1. A pressure type flow rate control apparatus for controlling flow rate of a fluid comprising:

means for forming an orifice;

control valve positioned upstream of the orifice for controlling flow to the orifice;

means for maintaining a pressure P1 upstream of the orifice at more than twice a pressure P2 downstream of the orifice, which pressure downstream of the orifice is at or less than atmospheric pressure;

pressure detector for measuring pressure P1 between the control valve and the orifice; and, calculation control means for receiving the measured pressure P1 and for calculating flow rate Qc through the orifice on the basis of the measured pressure P1 by a formula Qc=KP1 (K being a constant), for receiving a flow rate command signal Qs and for outputting a difference Qy between the flow rate command signal Qs and the calculated flow rate signal Qc to a drive unit for opening and closing the control valve;

wherein the pressure P1 upstream of the orifice is adjusted by opening and closing the control valve, thereby controlling the flow rate downstream the orifice; and wherein the control valve is coupled to an output of an inverting amplifier for receiving an output signal therefrom, said inverting amplifier receiving detected values, of the upstream side pressure P1 and the downstream side pressure P2, wherein when a state of P2/P1>0.5 occurs the drive unit closes the control valve.

2. A pressure type flow rate control apparatus as in claim 1, wherein a means for forming the orifice can be exchanged.

3. A pressure type flow rate control apparatus as in claim 1, wherein a mounting hole of the pressure detector and a mounting hole of an orifice-forming member are provided in a valve body of the control valve, with the valve body of the control valve being formed in the shape of a block.

4. A pressure type flow rate control apparatus as in claim 1, wherein an orifice-corresponding valve is provided at the downstream side of the orifice, and the orifice is positioned in a fluid inlet of a valve main body of the orifice corresponding valve.

5. A pressure type flow rate control apparatus as in claim 1, wherein the calculation control means includes a temperature correction circuit for correcting the value of the calculated flow rate Qc depending on a gas temperature T1 at the upstream side of the orifice.

6. A pressure type flow rate control apparatus as in claim 3 wherein an orifice forming member can be exchangebly inserted into the orifice mounting hole of the valve main body of the control valve.

* * * * *